(12) United States Patent
Smith

(10) Patent No.: US 7,647,776 B1
(45) Date of Patent: Jan. 19, 2010

(54) FLUID FLOW CONTROL SYSTEM

(75) Inventor: Trevor S. Smith, Sutton Coldfield (GB)

(73) Assignee: Goodrich Control Systems Limited, Bedfordshire (GB)

( * ) Notice: Subject to any disclaimer, the term of this patent is extended or adjusted under 35 U.S.C. 154(b) by 0 days.

(21) Appl. No.: 07/081,807

(22) Filed: Jul. 31, 1987

(30) Foreign Application Priority Data

Aug. 19, 1986 (GB) .................................... 8620171

(51) Int. Cl.
*F02K 1/17* (2006.01)
(52) U.S. Cl. ................................. 60/764; 60/241; 137/1
(58) Field of Classification Search .................. 60/243, 60/241, 261, 233, 39.281, 764, 761, 739, 60/244; 137/561 R
See application file for complete search history.

(56) References Cited

U.S. PATENT DOCUMENTS

| 3,857,241 | A | * | 12/1974 | Lewis | 60/241 |
| 3,866,416 | A | * | 2/1975 | Lewis | 60/241 |
| 3,874,170 | A | * | 4/1975 | Lewis | 60/241 |
| 3,918,253 | A | * | 11/1975 | Smith | 60/39.281 |
| 4,417,440 | A | * | 11/1983 | Hawes | 60/39.281 |

FOREIGN PATENT DOCUMENTS

GB 738895 * 10/1955 ............... 60/241

* cited by examiner

*Primary Examiner*—Timothy D Collins
(74) *Attorney, Agent, or Firm*—Nixon & Vanderhye P.C.

(57) ABSTRACT

A fluid flow control system includes a valve, in which a control element regulates flow through a metering orifice. A further control element regulates flow through an orifice downstream of the orifice and is responsive to the pressure downstream of the orifice and to an opposing control pressure on a line. The element is positioned in accordance with the pressure in a chamber controlled by an electrical valve. The pressure in line is set to provide a required pressure drop across the orifice.

5 Claims, 2 Drawing Sheets

FLUID FLOW CONTROL SYSTEM

BACKGROUND OF THE INVENTION

1. Field of the Invention

This invention relates to a fluid flow control system, and in particular to a system for controlling fuel flow to reheat burners of a gas turbine engine.

2. Discussion of Prior Art

A gas turbine engine reheat system commonly has three groups of burners which are supplied with fuel through respective manifolds, the fuel flows to the manifolds being controlled by respective metering devices. Typically two of the burner groups will require very high fuel flows and the metering devices and manifolds for those groups must be correspondingly large. It is also known to provide shut-off valves for arresting flow from the manifolds to the respective burner groups. Since a reheat system requires to be primed rapidly it is beneficial to locate the shut-off valves as close to the burner groups as possible.

SUMMARY OF THE INVENTION

The present invention provides a fluid flow control system which can advantageously be applied to a gas turbine engine reheat fuel supply by virtue of arranging that the metering and shut-off valves are combined in a single unit which is sufficiently small and light as to be located close to the burners.

According to the invention there is provided a fluid flow control system comprising a valve having a metering orifice, a first control element movable to regulate the flow area of said metering orifice, a second orifice in series with said metering orifice, and a second control element responsive to an increase in a fluid pressure downstream of said metering orifice and to an increase in a control pressure for respectively increasing and decreasing the flow area of said second orifice, said system also including a device for generating said control pressure to correspond to a desired pressure difference across said metering orifice.

Preferably said first control element is operable to shut off said metering orifice.

BRIEF DESCRIPTION OF THE DRAWINGS

An embodiment of the invention will now be described by way of example only and with reference to the accompanying drawings in which:—

DETAILED DESCRIPTION OF PREFERRED EMBODIMENTS

Figure 1:
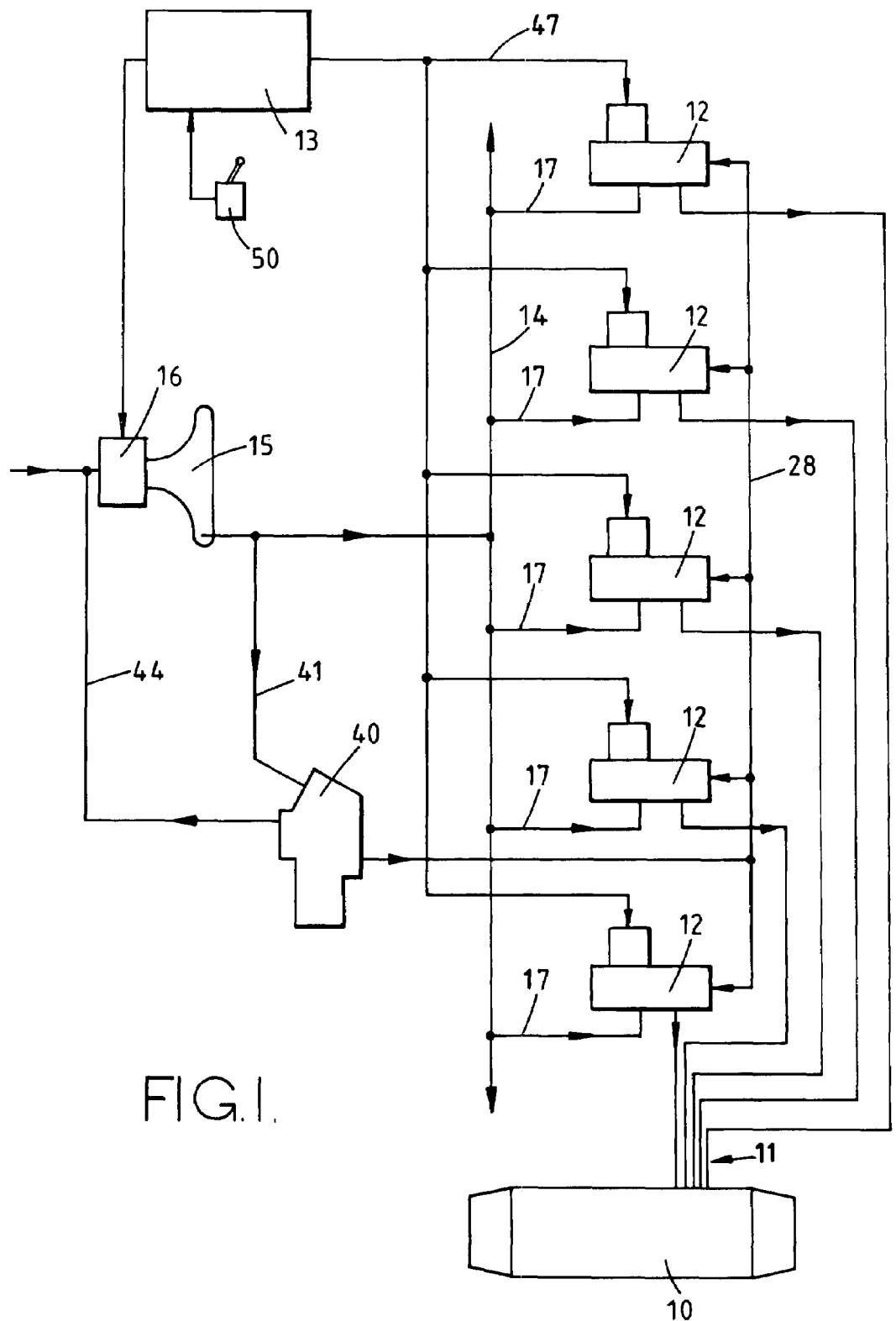
FIG. 1 shows diagrammatically a system for supplying fuel to a group of reheat burners in a gas turbine engine.

The gas turbine engine 10 shown in FIG. 1 includes core reheat burners arranged in five groups of three spray bars, the groups being supplied by respective fuel lines 11. Fuel flow through the lines 11 is controlled by respective ones of combined metering, shut-off and pressure drop control devices 12, each of which is responsive to an electrical control signal from a circuit 13. Fuel flows to the devices 12 through a manifold 14 which is supplied from a centrifugal pump 15 having a shut-off valve 16 at its inlet, the valve 16 being responsive to signals from the circuit 13. Each of the valve devices 12 is connected to the manifold 14 by a line 17 whose dimensions need only be sufficient to provide a required fuel flow through a corresponding one of the lines 11.

Figure 2:
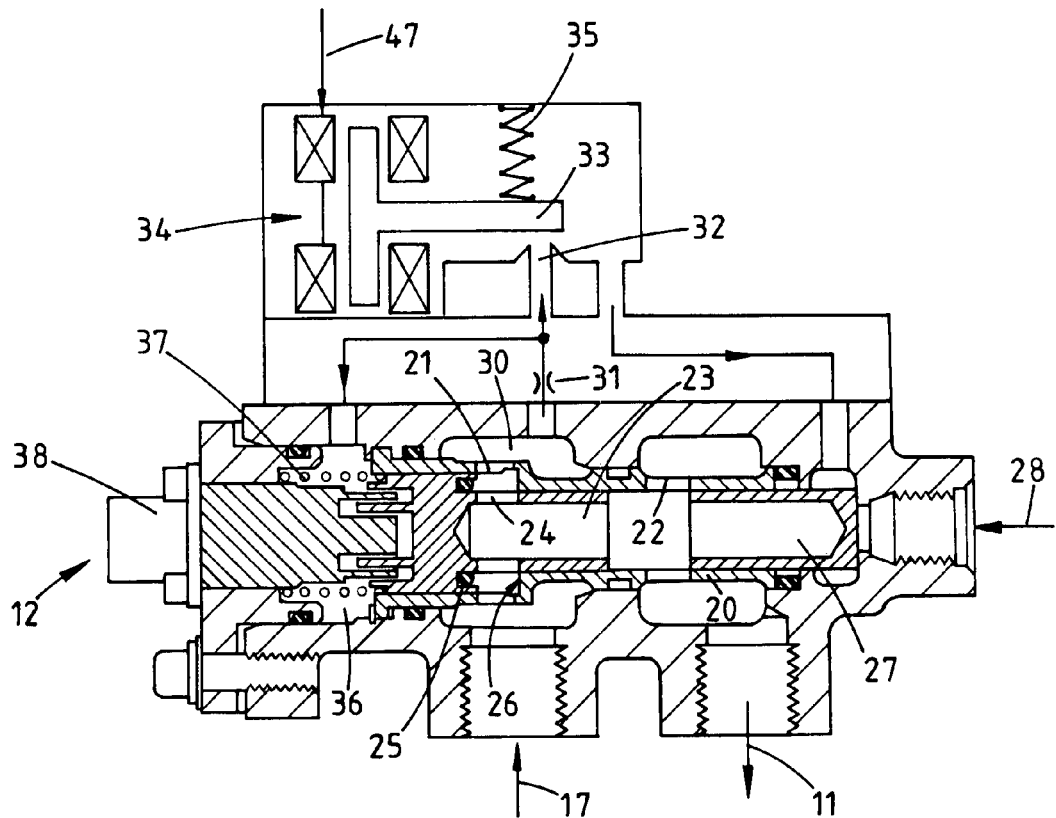
FIG. 2 is a diagram of a combined flow control and shut-off device forming part of FIG. 1.

As shown in FIG. 2 each of the devices 12 comprises a sleeve 20 having ports 21, 22 which communicate with the lines 17, 11 respectively. A control element 23 is slidable within the sleeve 20 and has ports 24 which co-operate with the sleeve 20 to define a variable metering orifice. The element 23 carries an elastomeric seal 25 which is engageable with a shoulder 26 of the sleeve 20 to arrest fuel flow. A shuttle control element 27 is slidable within the sleeve 20 and co-operates with the port 22. The element 27 is urged towards a fully open position by the pressure downstream of the ports 24 and is urged against that downstream pressure by the pressure in a line 28, this pressure corresponding to a required pressure downstream of the ports 24 and being derived in a manner later to be described.

The pressure in line 17 is applied through an annular chamber 30 and a flow restrictor 31 to an orifice 32. Flow through the orifice 32 is controlled by an element 33 which is pivotally movable by a torque motor 34 which is responsive to current signals from the circuit 13 (FIG. 1). A spring 35 biases the element 33 towards a shut position of the orifice 32. The pressure intermediate the restrictor 31 and orifice 32 is applied to one end of the element 23 by way of a chamber 36, this pressure being assisted by a spring 37. A capacitative position transducer 38 supplies the control circuit 13 with signals corresponding to the position of the control element 23.

Figure 3:
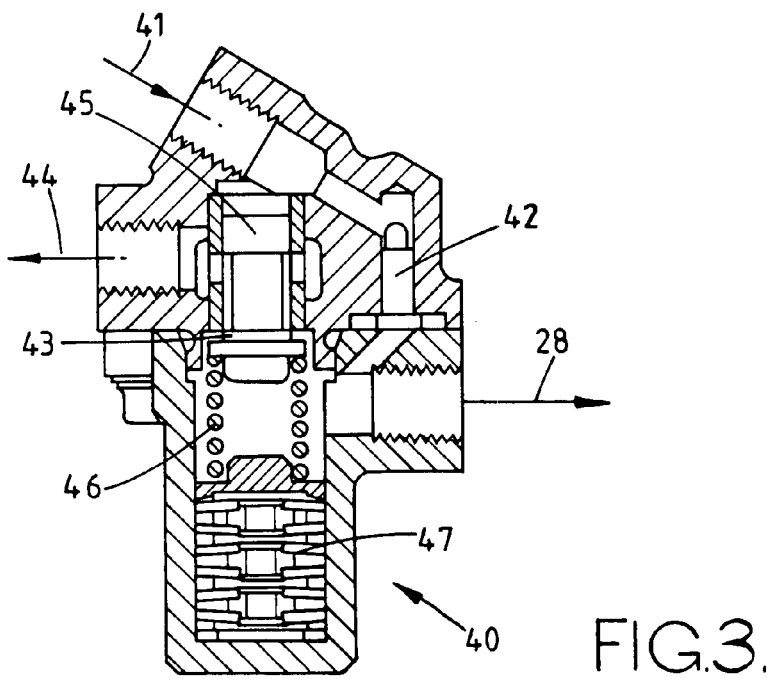
FIG. 3 is a diagram of a valve for providing a pressure signal corresponding to a desired metering pressure difference in the device of FIG. 2.

As shown in FIG. 1 the pressure in line 28 is provided by a valve 40 which is supplied on a line 41 with pressure from the outlet of the pump 15. The valve 40 is shown in more detail in FIG. 3 and comprises a fixed orifice flow restrictor 42 and a variable orifice 43 in series between the line 41 and a return line 44 to a low pressure zone upstream of the pump 15. Flow through the orifice 43 is controlled by a plunger 45 which is responsive to the pressure in line 41 and is biased against this pressure by a spring 46. The line 28 communicates with a zone between the restrictor 42 and orifice 43. The loading of the spring 46 and the area of the plunger 45 which is subjected to the pressure in line 41 are selected so that the pressure in line 28 is below that in line 41 by an amount which is equal to the desired metering pressure difference through the ports 24 of the control element 23. A stack of bimetal spring discs 47 is responsive to fuel temperature to modify the loading of the spring 46.

In use the required reheat fuel flow to the group of burners supplied by the lines 11 is signalled on line 47 from the circuit 13 in response to operating conditions of the engine 10 and a reheat selector device 50 (FIG. 1). The control element 23 is urged in an opening direction by the pressure downstream of the ports 24 and by the pressure in line 17, and in a closing direction by the spring 37 and pressure in chamber 36, this latter pressure being dependent on the magnitude of the current in line 47, this current being responsive to the feedback signal from the transducer 38 and to a flow demand signal from the selector device 50. Flow through the ports 24 is thus effectively dependent on the current in line 47. If the metering pressure difference increases, the pressure downstream of ports 24 falls below that in the line 28 and the control element 27 moves to reduce flow through the ports 22, reducing the metering pressure difference to its required level. The element 27 moves correspondingly to increase flow through the ports 22 if the metering pressure drop decreases.

When the reheat system is shut down the pump inlet shut-off valve 16 (FIG. 1) is shut and the pressure in line 17 and downstream thereof falls. The spring 37 urges the element 23 so that the elastomeric seal 25 engages the shoulder 26, preventing further flow to the line 11. In the event of failure of the electrical supply on line 47 the orifice 32 is shut under the influence of the spring 35 and the pressure in chamber 36 rises to equal that in line 17. The device 12 thus fails to a shut-off condition in the event of electrical failure.

It will be understood that the remaining reheat burners, that is the primary and bypass burners also comprise a plurality of spray bars arranged in one or more groups which are supplied from the manifold 14, there being a valve 12 for each group, as before. The provision of a valve 12 for each group enables the groups to be selectively supplied with fuel, so that metering efficiency at low reheat flows is improved.

The arrangement reduces the weight of pipe runs by requiring only a single manifold 14, instead of the three manifolds hitherto used.

The invention claimed is:

1. A fluid flow control system comprising:
   a plurality of identical metering valves, each valve having:
      a metering orifice;
      a first control element movable to regulate the flow area of said metering orifice;
      a second orifice in series with said metering orifice; and
      a second control element, responsive to an increase in a fluid pressure downstream of said metering orifice and to an increase in a control pressure, for respectively increasing and decreasing the flow area of said second orifice; and
   said system also including a device for generating a single control pressure to which each of said second control elements responds and which corresponds to a desired pressure difference across each said metering orifice.

2. A fluid flow control system comprising:
   a plurality of identical metering valves, each valve having:
      a metering orifice;
      a device for generating a first fluid pressure signal which is dependent on the magnitude of said electrical signal;
      a first control element movable, in response to said first fluid pressure signal, to regulate the flow area of said metering orifice;
      a second orifice in series with said metering orifice; and
      a second control element responsive to an increase in a fluid pressure downstream of said metering orifice and to an increase in a control pressure for respectively increasing and decreasing the flow area of said second orifice;
   said system also including a circuit for generating said electrical signal corresponding to a desired flow through each said valve; and
   a device for generating a single control pressure to which each said second control elements responds and which corresponds to a desired pressure difference across each said metering orifice.

3. A system according to claim 2 in which said first control element is operable by a biasing means to shut said metering orifice.

4. A system according to claim 2 in which the device for generating said control pressure comprises fixed and variable flow orifices in series between a pressure source and a lower, return pressure connection, said control pressure being derived from that between said orifices and the flow through said variable orifice being selectively variable by a spring.

5. A system according to claim 4 in which said pressure source supplies fluid to said valve and said spring is selected so that a difference between the pressure at said source and said control pressure has a constant relationship to the pressure difference across said metering orifice.

\* \* \* \* \*